Feb. 16, 1965 P. E. RENOUX 3,169,426
THREAD CUTTING MACHINE
Filed July 25, 1961 6 Sheets-Sheet 1

Fig.1

INVENTOR
PIERRE EDOUARD RENOUX
By Linton and Linton
ATTORNEYS

Fig. 4

INVENTOR
PIERRE EDOUARD RENOUX
By Linton and Linton
ATTORNEYS

United States Patent Office 3,169,426
Patented Feb. 16, 1965

3,169,426
THREAD CUTTING MACHINE
Pierre Edouard Renoux, Colombes, France, assignor to Cri-Dan, Paris, France, a company of France
Filed July 25, 1961, Ser. No. 126,618
Claims priority, application France, June 8, 1961, 864,328
17 Claims. (Cl. 82—5)

This present invention relates to thread-cutting machines of a general type similar to thread-cutting lathes, and especially though not exclusively suitable for the threading of continuous elongated work stock, e.g. tubing either externally or internally.

In such machines the work piece is supported in a spindle rotatably mounted in a headstock and driven in rotation about a geometric axis of the work piece (e.g. the axis of the tubing). A tool carrier carrying a thread-cutting tool is mounted on the machine frame by way of longitudinally and transversely displaceable slides so as to be capable of assuming a path of motion including both a longitudinal and a transverse component relative to the work piece for the cutting of the desired screw thread on the latter. The path of motion described by the tool carrier is usually controlled by suitable cam means, and may be controlled for the performance of both outer and inner thread cutting operations as may be required.

In workshops employing this kind of machine for the threading of work stock such as steel tubing and the like, which may vary in diameter say from 80 to 400 mm. and in length from 3 to 15 meters, high production rates are desired and hence a high degree of automaticity as well as high-powered machines are required.

In view of the size and weight of the stock worked on it is also desirable in such workshops to minimize the requisite floor space as well as the handling operations involved.

With the above requirements in mind, it has been found desirable to provide a common combined machine which would be capable, prior to the thread-cutting of the tube ends, of cutting off the rough and poorly-shaped extremity that is inevitably present as a result of the prior tube rolling process.

It is accordingly among the objects of this present invention to provide one common combined machine that will be capable of cutting off the rough, as-rolled extremity of the tube stock, turning the resulting clean end section, and threading it. It is, consequently, an object of this present invention to eliminate the necessity of installing two, and sometimes even three, different machines with their accompanying control and ancillary equipment, namely an end-cutting machine, an end shaving and chamfering machine, and a thread-cutting machine.

A further object of the present invention is to attain high production rates through a more effective employment of a high-powered drive, while maintaining the close tolerances that are required in the finished parts.

It is yet another object of the present invention to provide a very simple and effective solution to the problem encountered in the use of single-spindle automatic lathes where it is required to dispose the various necessary tools and tool carrier means around the axis of the work piece, in different positions while leaving the necessary clearance for discharge of the cut-off end and the large amount of cuttings produced in a machine of the high output here contemplated.

With the above and further objects in view, a combined machine-tool according to an important aspect of the present invention for thread-cutting e.g. tubular work stock and cutting off a length of said stock, comprises a frame, a work-carrier element supported on the frame for rotation about an axis of the work stock; tool carrier means mounted for displacement relative to the frame longitudinally and transversely of the work piece axis; a thread-cutting tool and a cutting-off tool carried on the carrier means in mutually displaced positions thereon; first drive means connected with the tool carrier means for imparting a prescribed path of motion thereto including both a longitudinal and a transverse component of motion relative to the work piece; second further drive means connected with said tool carrier means for imparting a transverse path of motion thereto relative to the work piece; and control means selectively operable for cyclically disabling said first drive means and enabling said second further drive means to cause the cutting-off tool to cut off a length of the work stock and for disabling said second further drive means and enabling said first drive means to cause the thread-cutting tool to cut a screw-thread in the work stock.

According to a preferred embodiment, the said machine-ool comprises a frame, a work carrier element supported on the frame for rotation about an axis of the work piece; a pair of separate tool carrier means both mounted for displacement relative to the frame longitudinally and transversely of the work piece axis and positioned in different positions on opposite sides of said axis; a pair of thread-cutting tools and a pair of cutting-off tools respectively in mutually-displaced positions on each of said two tool carrier means for cooperation and engagement with a respective side of the work piece; first drive means connected with both of said two tool carrier means for imparting prescribed paths of motion thereto including both longitudinal and transverse components of motion relative to the work piece; second further drive means connected with both of said two tool carrier means for imparting symmetrical transverse paths of motion thereto relative to the work piece; and control means selectively operable for cyclically disabling said first drive means and enabling said second further drive means to cause both of said pair of cutting-off tools simultaneously to cut off a length of the work stock, and for disabling said second further drive means and enabling said first drive means to cause the two thread-cutting tools simultaneously to cut a screw-thread in the work stock.

According to a preferred form of embodiment, in this latter aspect of the present invention, the two tool carrier means are symmetrically supported respectively on related pairs of slides displaceable longitudinally and transversely of the machine frame. The first afore-mentioned drive means are powered from the spindle-rotating motor to impart to the pairs of slides mounting both tool carrier means correlated longitudinal and transverse displacements to cause the two thread-cutter tools to describe the desired thread-cutting paths relative to the work piece; and the second afore-mentioned further drive means are powered from a separate auxiliary motor to impart to said slides the correlated symmetrical transverse displacements to cause the pair of cutting-off tools to describe respectively said transverse displacements relative to the work piece. Automatic, e.g. electrically actuated, control means are provided for cyclically disabling and enabling the respective one of said two drive means for accomplishing the desired sequential operation of the slides and tool carriers.

All the tools are mounted for sequential operation, in such manner as to prevent the tools that may be idle at a particular time from contacting the work piece, and the various component motions are transmitted to each tool slide through a common element.

The various objects, features and advantages of the present invention will be understood from the ensuing description of a form of embodiment thereof given for purposes of illustration but not of limitation with reference to the accompanying drawings, wherein.

Figure 1:
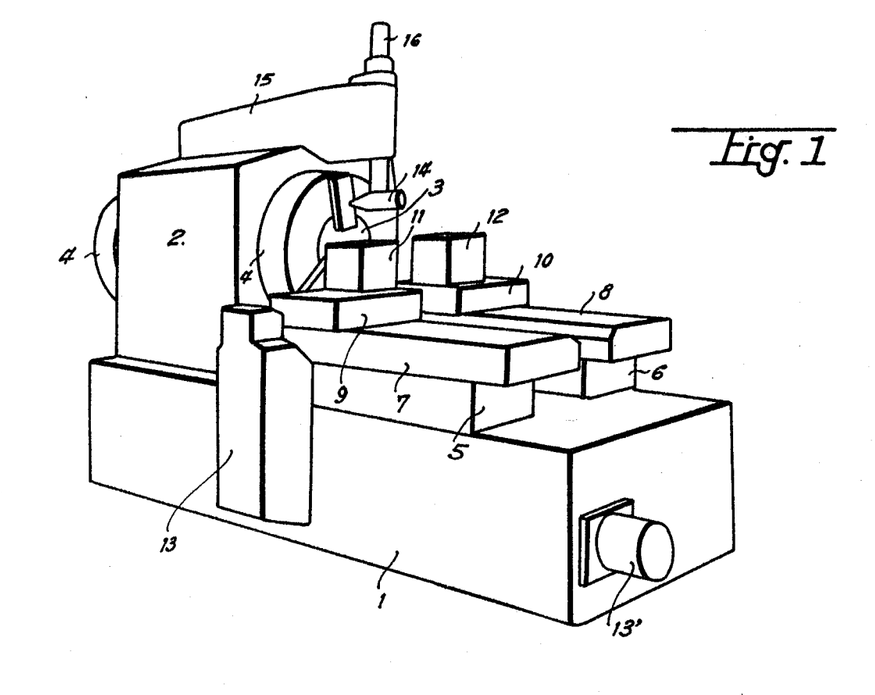
FIG. 1 is a perspective view of a complete combined machine built according to the present invention.
Figure 2:
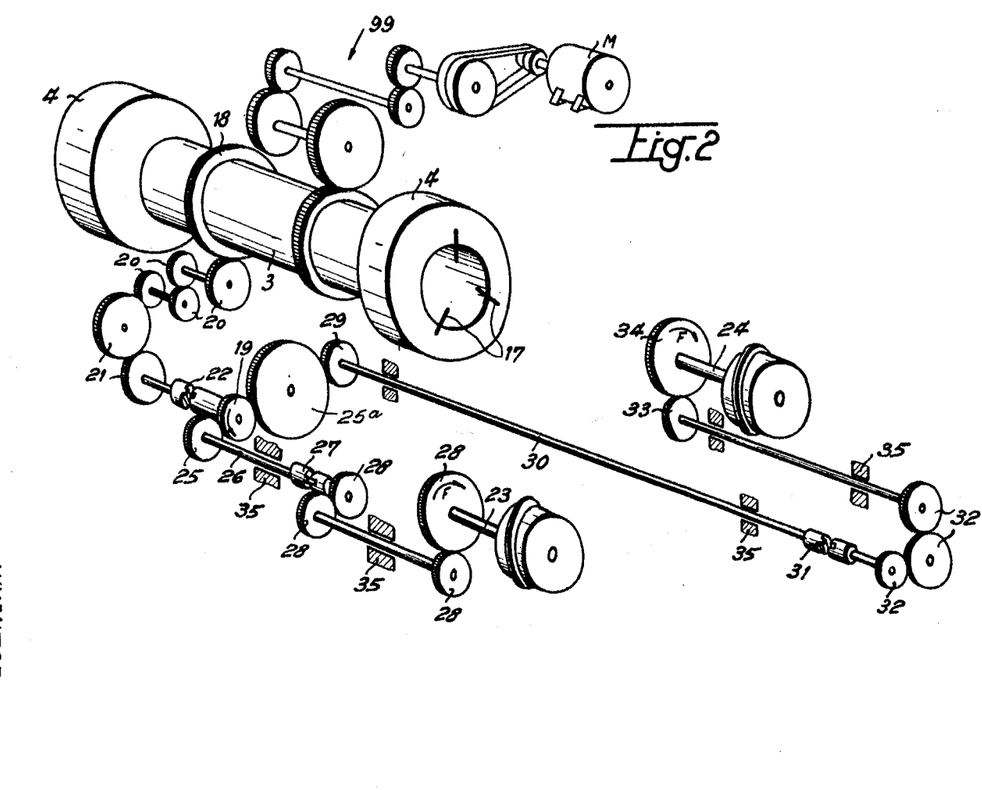
FIG. 2 is a detailed perspective view of various drive transmissions involved in the operation of the combined machine of FIG. 1.
Figure 8:
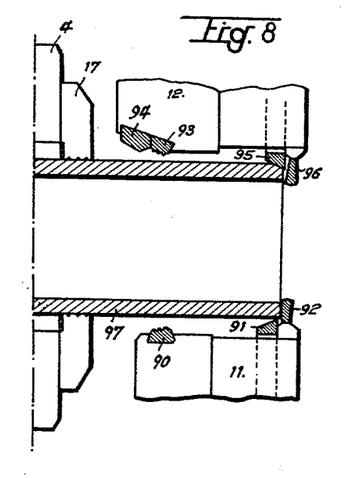
FIGS. 8, 9 and 10 are diagrammatic detail views illustrating successive stages of the operation of the combined machine.

Referring first to FIG. 1, a combined machine according to a preferred embodiment of the present invention comprises a frame 1 carrying a head-stock 2 in which is rotatably mounted a spindle 3 driven in rotation from a motor not shown in FIG. 1 but shown in FIG. 2. The frame 1 further supports a pair of tables 5 and 6 carrying the longitudinally reciprocable slides 7 and 8 and thereon the transversely reciprocable slides 9 and 10 which latter in turn support the tool carriers 11 and 12 respectively. The cutting and threading tools carried on these tool carriers are shown in FIG. 8. Shown at 13 is one of a pair of similar, symmetrical side frame structures containing certain control and transmission mechanisms to be described in detail hereinafter. Reference 14 designates an adjustable stop attached to a head 15 by a depending vertical shaft 16 which is slidably adjustable in vertical position.

FIG. 2 shows a detail of the spindle 3 with chucks 4 thereon provided with the usual clamping jaws 17 which hold the work piece 97 (FIG. 8). 99 designates the assembly of conventional transmission gears for driving the spindle 3 from a motor M, the transmission including a belt drive followed by gearing providing the necessary reduction ratio. The spindle 3 is provided with a gear annulus 18 thereon for transmitting the rotational drive to a primary gear 19 through intermediate variable gearing generally designated 20 including ratio-modifying means (e.g. selectively substitutable gears), followed by secondary gears 21 and an electrically controlled dog clutch 22 of the type having a single relative angular position of engagement.

From primary gear 19 motion is transmitted to two camshafts 23 and 24 both arranged to rotate in the same direction, as indicated by the arrows F (FIG. 2). One of the drive paths is from primary gear 19 through gear 25 to shaft 26, through dog clutch 27 (of a type similar to clutch 22), and through modifiable-ratio gearing set 28 to camshaft 23. The other drive path is from gear 25 a through gear 29 to shaft 30, dog clutch 31 (similar to the foregoing), modifiable-ratio gearing set 32 and gears 33 and 34 to camshaft 24.

Suitable bearing means, schematically indicated at 35, (FIG. 2) are provided for supporting the various shafts shown at suitable positions in the frame 1.

It will be apparent that though the gear transmissions just described with reference to FIG. 2, the camshafts 23 and 24 can be rotated from the spindle 3, either at a common speed which is adjustable by adjustment of the variable gearing 20, or at different respective speeds by separate adjustment of each of the gearings 28 and 32. Further, both camshafts 23 and 24 can be disengaged from the motor drive by disengagement of clutch 22, or only a selected one of these two camshafts can be disengaged by releasing the related one of electrically controlled clutches 27 and 31. On reengagement of any of the clutches, 27 and 31 because of the one-positional character of these latter, the mentioned components resume operation from the angular positions they had assumed on disconnection of the motor drive.

It will be understood that the drive means shown in FIG. 2 form part of the designated "first drive means" which, according to the present invention, serve to transmit the drive from the spindle drive motor M to each of the two tool carriers 11 and 12 (FIG. 1) not shown in FIG. 2. As will appear presently, the camshaft 23 serves to displace in the respective direction both slides 7 and 9 supporting tool carrier 11, and camshaft 24 similarly serves to displace both slides 8 and 10 supporting one other tool carrier 12.

Figure 3:
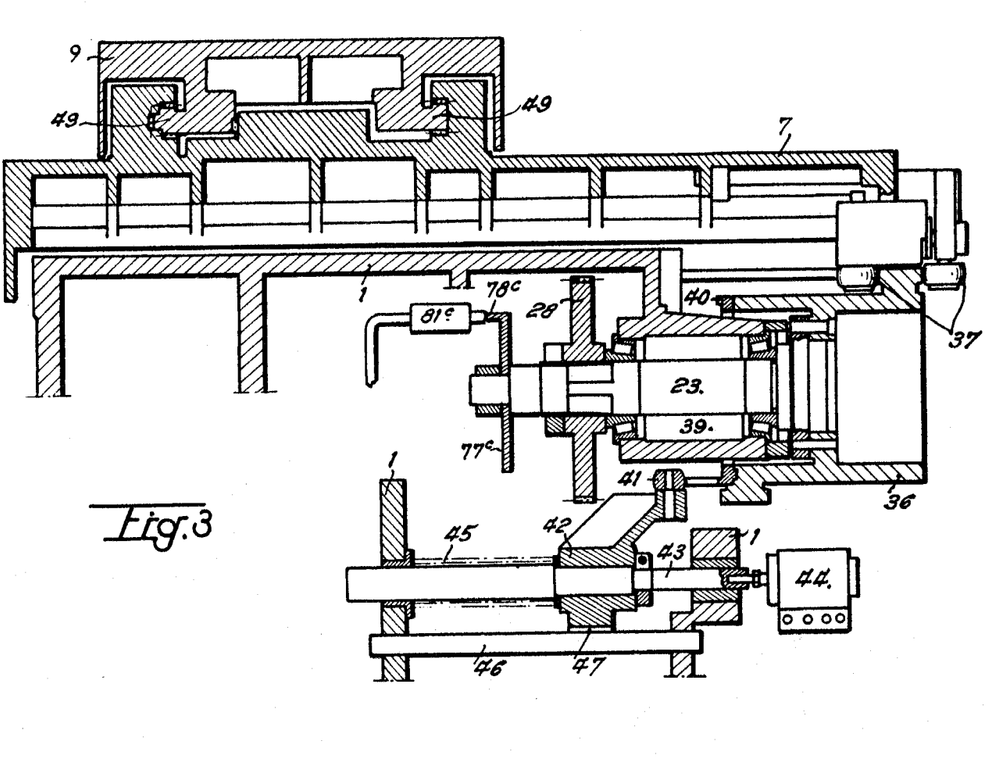
FIG. 3 shows in section the assembly of a control for a camshaft and mechanism operated thereby.

In FIG. 3, is illustrated the assembly of the first camshaft 23, it being understood that the components now to be described are duplicated, in symmetrical relation to those shown, on the other side of the machine in connection with second camshaft 24. The first camshaft 23 drives a first, longitudinal-displacement cam surface 36 which acts by way of cam follower rollers 37 directly upon the longitudinal slide 7 previously referred to in connection with FIG. 1.

As shown in FIG. 3, first, camshaft 23 is journalled in a bearing generally designated 39 supported in frame 1. Drive gear set 28 carried by camshaft 23 appears on both FIGS. 2 and 3. Secured to the first cam contour surface 36 is a second cam contour surface 40 acting on a cam follower roller 41 supported from a displaceable bracket 42 carried by the shank 43 of a hydraulic control valve 44. As shown, valve shank 43 is normally urged in the direction towards the cam surface 40 by a spring 45 interposed between a stop surface projecting from frame 1 and displaceable bracket 42. Shown at 46, is a guide rod cooperating with a fork 47 projecting from bracket 42 to prevent rotation of the bracket.

As seen in FIG. 3 rotation of camshaft 23 produces through the action of first cam 36 longitudinal displacement of longitudinal slide 7 in a manner known per se; and through the second cam surface 40, rotation of the camshaft actuates the hydraulic valve shank 43. The control valve 44 controls the motion of the transverse slide 9 mounted on the longitudinal slide 7 by way of conventional means such as rollers and runways 49.

Figure 4:
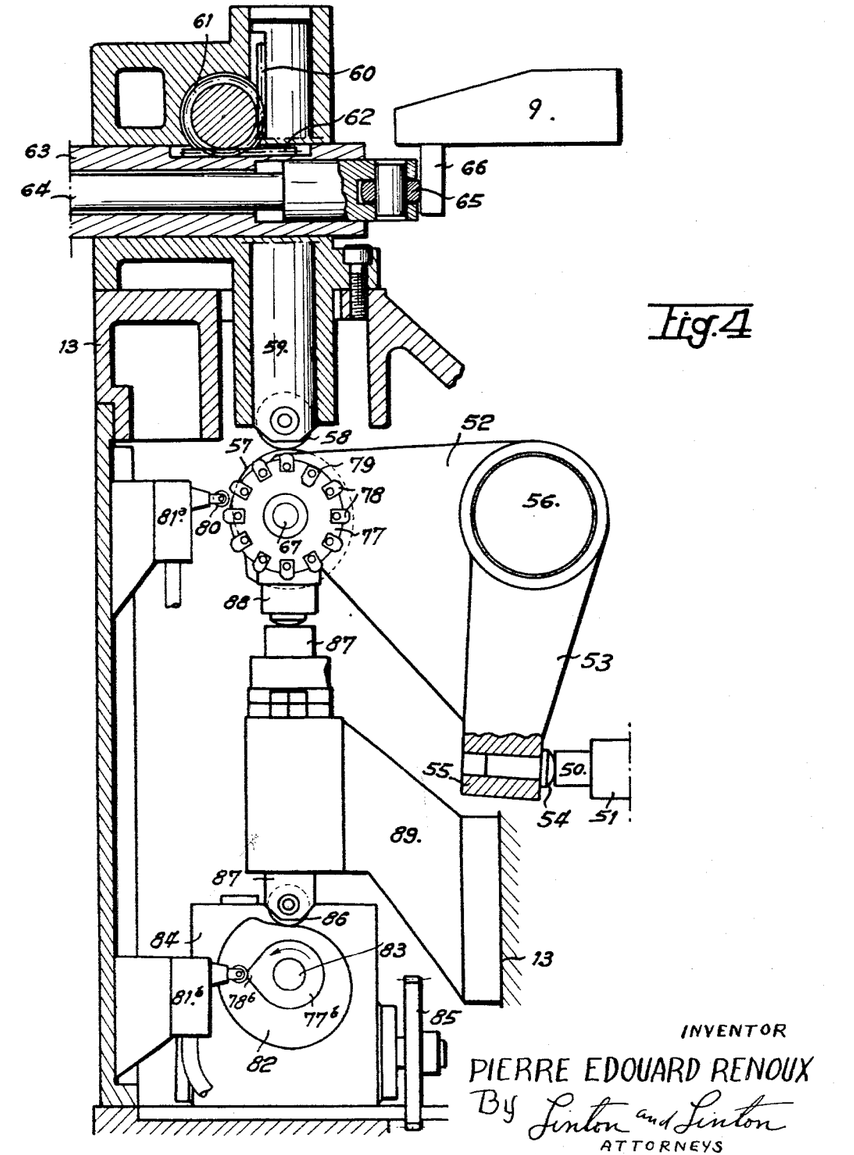
FIG. 4 is a sectional view of the control mechanism for causing transverse movement of a tool slide.

Reference will now be had to FIG. 4 which illustrates in detail the mechanism through which the hydraulic control valve 44 controls the motions of transverse slide 9.

As shown, in FIG. 4, a piston 50 protrudes from a hydraulic actuator cylinder 51 which is operable through control valve 44 (FIG. 3) by way of conventional hydraulic fluid circuitry not shown. Piston 50 acts on one arm 53 of a two-armed bell-crank lever 52–53 by way of a spherical-surface contact element 54 projecting from the end of lever arm 53. Bell-crank lever 52–53 is pivoted on a shaft 56 supported on the machine frame. The other arm 52 of the bell-crank lever carries a cam 57 the function of which will be apparent later and which cam 57 acts on a cam follower roller 58 journalled at one end of a displaceable rod 59 formed with a rack 60 along one side of it, said rod 59 being mounted for vertical movement in the frame structure generally designated 13 in FIG. 1. Attached to arm 52 is a pawl and ratchet assembly 68, 69, 70, shown in detail in FIG. 6. Rack 60 meshes with a gear 61 which also meshes with a second rack 62 at right angles to rack 60, and which rack 62 is connected with a push-rod assembly 63 in which is secured by means not shown a rod 64 carrying at one end a roller 65 cooperating with a flat rail 66 projecting from the transverse slide 9. Suitable biassing spring means not shown are interposed between slides 7, 9. Upward displacement of rod 59 causes displacement to the right of rod 63 for exit of the cut chips.

It will be understood that through the chain of components described, it is possible to use the hydraulic control valve 44 and hence the cam surface 40 rotated by camshaft 23, (FIG. 3) to control the transverse motions of the transverse slide 9 and related tool carrier 11 in synchronism with the longitudinal displacements controlled through cam 36 (FIG. 3) which, as explained earlier, acts directly on the longitudinal slide 7.

The function of radial feed cam 57, shown in FIG. 4, is to impart a progressive increment of displacement to the transverse slide 9 at each to-and-fro movement imparted to said slide by the reciprocating stroke of rocking lever 52–53 when several passes are necessary, in order that the resulting screw thread cut in the work shall have the desired depth. The operating means for cam 57 are shown in greater detail in FIG. 6.

Figures 5, 6, 7:
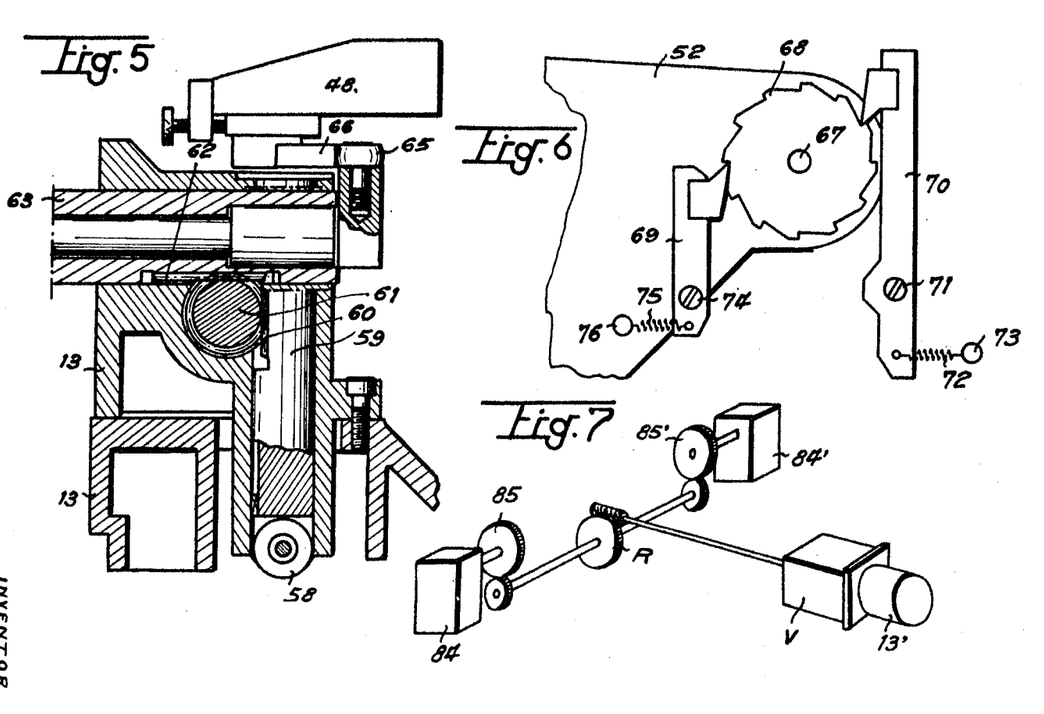
FIG. 5 illustrates a modification wherein the cam follower roller causes a different kind of displacement.
FIG. 6 shows a detail thereof.
FIG. 7 illustrates a detail of the cutting off mechanism.

It will be noted that FIG. 6 is a rear view showing in detail the components provided rearward from the bell-crank arm 52 of the rocking lever 52–53, as shown in FIG. 4, and which components are not depicted on this latter figure for clarity. Cam 57 (FIG. 4) is secured on a camshaft 67 which also has secured thereon a ratchet 68 cooperating with two oppositely disposed pawls 69 and 70. Pawl 70 is pivoted at 71 on the side frame section 13 and is biassed by a spring 72 attached at 73 to said frame section. It will therefore be understood that any upward movement of shaft 67 causes a clockwise rotation (in FIG. 6) of ratchet 68 and hence a corresponding rotation of cam 57 (FIG. 4). Consequently the transverse, work-engaging, movement of the tool carried on tool carrier 11 results in producing the progressive infeed which is required for obtaining the full depth of the screw-thread. Pawl 69 (FIG. 6) is pivoted at 74 on bell-crank lever arm 52 and is biassed towards the ratchet by a spring 75 attached at 76 to said arm 52. Pawl 69 thus acts as a counter-pawl to prevent reverse rotation of ratchet wheel 68 and hence of the feed cam 57 (FIG. 4).

It will be apparent from the foregoing that rocking movements of bell-crank lever 52–53 produce both the work-disengaging and work-engaging movements of the tool mounted on tool carrier 11 and also the radial feed displacement.

It is also noted in FIG. 4 that shaft 67 carrying cam 57 and ratchet 68 (FIG. 6) also has secured thereon a separate control wheel 77 around the periphery of which a number of pivotally retractable stops 78 are attached; of these, one stop 79 has been shown in its retracted position. The stops 78 cooperate with a roller 80 actuating a micro-switch 81a and serve together with further components to be described, hereafter, to effect electric automatic control of the operating cycles of the machine. Thus, it will be understood for example that in the position shown, each of the stops 78 other than the retracted stop 79 can actuate a respective micro-switch contact 81a.

Still referring to FIG. 4, means will now be described for performing the end-cutting off operation, which means are actuated at periods when the camshafts 23 and 24 (FIG. 3) are not rotated so that the longitudinal slide 7 is stationary, as is also the piston 50 actuating rocking bell-crank lever 52–53.

At such times, a transverse displacement is imparted to slide 9 by means of a cam 82 (FIG. 4) secured on a camshaft 83 (FIG. 4) protruding from a casing 84 which houses transmission means, not shown, transferring the motion from gear 85 to shaft 83. The cam 82 acts on a cam follower roller 86 carried by a pushrod 87 slidable in a bracket 89 mounted on the side frame section 13. The rod 87 actuates a stop 88 projecting from the end of rocker bell-crank lever 52–53. It will therefore be seen that rotation of the cam 82 causes transverse displacement of slide 9 by way of the chain of components 86, 87, 88, 52, 57, 58, 59, 60, 61, 62, 63, 64, 65 and 66.

Referring to the detail view of FIG. 7, it will be seen that the gear 85 of FIG. 4 and its corresponding symmetrical gear 85' are rotated in synchronism from an auxiliary electric motor housed in the side frame structure 13' visible in FIG. 1, through a common speed changer V and a common reducer gearing R, in such a way that the transverse slides 9 and 10 of the machine have symmetrical, equal-amplitude, motions imparted to them. Thus it will be understood that the drive means just described including auxiliary motor 13', the gearing V, R, 85–85', cams 82 and the above-identified chain of components, comprise what has been termed herein the second "further drive means," serving to impart to both of tool-carrier means 11 and 12 the symmetrical, transverse paths of motion thereof relative to the work, for cutting off the end of the work stock by means of the cutting-off tools carried by said tool carriers.

FIG. 4 also shows another angularly adjustable cam disk 77b secured on shaft 83, and rotatable bodily with cam 82, on the same shaft which cam disc 77b has a boss 78b adapted to actuate an electric switch contact 81b when the cam 82 has effected a full revolution.

Similarly an adjustable cam disk 77c rotatable with the shaft 23 (FIG. 3) actuates, by way of a boss 78c thereof, an electric contact 81c. The contacts 81a, 81b, 81c and their symmetrical counterparts on the opposite side of the machine, are used as sequencing controls to provide the timed cyclic operation desired.

Reference will now be made to FIG. 5 which illustrates a modification of a part of FIG. 4 wherein the rod 59 carrying cam follower roller 58 previously referred to, (FIG. 4) acting by way of racks 60 and 62 and a gear 61, causes on its upward displacement according to the drawing of FIG. 5, a leftward displacement of pushrod 63, whereas in the first embodiment described and shown in FIG. 4 such displacement was effected rightward. Roller 65 now acts upon an outwardly disposed rail 66. This modified assembly is used in cases where the internal rather than the external thread-cutting of a tube is involved.

Figure 9:
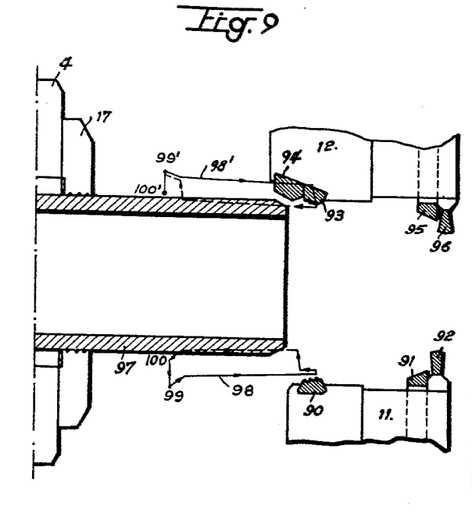
Figure 10:
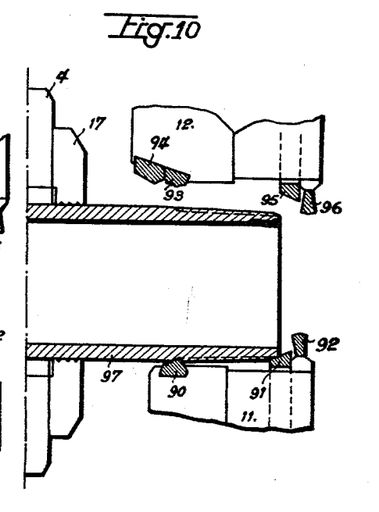

FIGS. 8, 9 and 10 illustrate for an operating cycle, details in succession of a typical example of successive steps of a machining operation involving a single cyclic motion of each of the tool-carrier means which may be used with the embodiment shown in FIG. 1. A tubular workpiece 97 has been inserted in position within chuck 4, if necessary using the locator stop 14 (FIG. 1) retractible by means of rod 16, and serving to adjust the positioning of the work piece. The drawings of FIGS. 8, 9, and 10 also show the first tool carrier 11 equipped with a thread-cutting tool 90, a shaving tool 91 for deburring the initial threads, and a cutting-off tool 92. FIG. 8 shows the positions of the several tools on tool holder 11 at a given time.

The second tool holder 12, on the other hand, is equipped with the thread-cutting tool 93, turning tool 94, chamfering tool 95 and cutting-off tool 96. The figures further show the chuck 4 and jaws 17. The workpiece 97 is arranged for insertion from the rear of the machine.

At the start of the machining cycle, the toolholders 11 and 12 are situated at the points 99–99' of their respective path shown in FIG. 9.

It must be understood that the lines 98–98' represent the paths of the point of the last tooth respectively of tools 90 and 93.

The principal drive spindle motor M is started together with auxiliary motor 13', while dog clutch 22 is disengaged. Under the action of cams 82 the toolholders 11 and 12 describe paths 99, 100, 99' and 100', so that the cutting-off tools are fed through the pipe wall until they reach the position shown in FIG. 8, where a certain length of tube has been cut-off and the tool 95 has formed the required chamfer at the end of the pipe 97.

When cams 82 have completed one revolution, the toolholders 11 and 12 have returned to their starting position corresponding to points 99–99' of their respective paths, and the microswitch 81b is actuated with the effect of stopping auxiliary motor 13' and engaging dog clutch 22.

In the case considered of a single-cycle motion, clutches 27 and 31 are maintained engaged permanently. Engaging clutch 22 results in starting the rotation of both cam shafts 23 and 24 which imparts to toolholders 11 and 12 the motion represented by the paths 98, 98'. During this motion the tool 94 performs a turning cut, followed by tool 93 which takes a rough threading cut. Simultaneously tool 90 takes the finish threading cut, the latter tool being axially lagging, in relation to tool 93, by an odd number of half-pitches, so as to follow exactly the same thread.

Thereafter, in the next operating phase, as shown in FIG. 10, the toolholder 12 is moved away while the toolholder 11 still remains in working position to effect a shaving step by shaving tool 91, while the tool 90 describes the slanting or tapered segment of the path shown in FIG. 9.

The machining cycle is ended when the cam shafts 23 and 24 have completed one revolution, while the toolholders 11, 12 have returned to positions 99, 99' of the diagram shown in FIG. 9. At this moment, cams 77c actuate microswitches 81c which control the disengagement of clutch 22 and the stopping of the spindle motor. The chucks are opened, the tube can be moved away, and a fresh operation repeated as has been described.

When the trajectories 99–100 and 99'–100' are described, this means that tools 90 and 93 describe these trajectories and then the tools 92 and 96 effect a parallel trajectory to reach the cut-off position shown in FIG. 8.

It will readily be understood that the machine here described can be adjusted in different ways so as to perform a plurality of passes, simultaneously or in succession, by means of each tool-carrier means. The mechanism previously described with reference to FIG. 4 provides for the necessary depth feed of the tool holders from each pass to the next, and the electric contacts 81a, 81b, 81c act respectively to disengage and engage the clutches 22, 27 and 31, and to stop and start the motor 13', as well as finally arresting machine operation at the desired time.

In the series of steps indicated above with reference to FIGS. 8, 9 and 10 for instance, after the work-piece has been inserted in position, principal motor M is first started manually or automatically, then similarly auxiliary motor 13' is started to effect the cutting step. At this time, the cam 77b acts, through electric contact 81b, to command the start of the turning step (clutches 22, 27 and 31 engaged, auxiliary motor 13' deenergized). Lastly contact 81a acts to disengage clutch 31 to perform the shaving step. Thereafter the finished tube can be removed, automatically or manually.

It will thus be apparent that the various objects assigned to the present invention have been attained, in that a machine has been provided whereby all of the steps involved in the cutting, threading and shaving of an end section of a tube can be performed independently of one another or simultaneously.

It will also be evident that many modifications may be made in the details of the embodiment described and illustrated without departing from the scope of the invention.

Various of the features illustrated and described as combined in a common machine may be applied independently of other features. The construction of the various drive means used may differ substantially from those shown.

The nature and arrangement of the tools carried by the tool carrier means may differ depending on different applications. The sequence in which the tools perform their work, especially for cutting off the work stock and for cutting a screw-thread in the work stock, may likewise differ from the sequence herein shown and described.

What I claim is:

1. A machine-tool comprising a frame; work-carrier means supported on the frame for rotation about an axis of the workpiece; motor means for rotating said workpiece-carrier means; tool carrier means mounted for displacement relative to the frame longitudinally and transversely of the workpiece axis; thread-cutting tool means and cutting-off tool means carried on the tool carrier means in mutually displaced positions thereon; first drive means connected with the tool carrier means for imparting thereto a prescribed path of motion having both a longitudinal and a transverse component relative to the workpiece; second further drive means connected with said carrier means for imparting thereto a transverse path of motion relative to the workpiece; and control means selectively operable for cyclically disabling said first drive means and enabling said second further drive means to cause the cutting-off tool to cut off a length of the workpiece, and for disabling said second further drive means and enabling said first drive means to cause the thread-cutting tool to cut a screw-thread in the workpiece.

2. A machine-tool comprising a frame; workpiece-carrier means supported on the frame for rotation about an axis of the workpiece; motor means for rotating said workpiece-carrier means; a pair of separate tool carrier means mounted for displacement relative to the workpiece longitudinally and transversely of the workpiece axis and positioned on opposite sides of said axis; a thread-cutting tool and a cutting-off tool in mutually-displaced positions on each tool carrier means for cooperation with a respective side of the workpiece; first drive means connected with both of said tool carrier means for imparting thereto prescribed paths of motion having both longitudinal and transverse components relative to the workpiece; second further drive means connected with both of said tool carrier means for imparting thereto at a desired time symmetrical transverse paths of motion relative to the workpiece; and control means selectively operable for cyclically disabling at a desired time said first drive means and enabling said second further drive means to cause both cutting-off tools to simultaneously cut off an end length of the workpiece, and for disabling at another desired time said second further drive means and enabling said first drive means to cause the thread-cutting tools to simultaneously cut a screw-thread in the workpiece.

3. The machine-tool claimed in claim 2 said tool carrier means comprising a first set of slides for separate longitudinal displacement relative to the frame and a second set of slides for separate transverse displacement relative to the frame, a camshaft in each of said first drive means; a first cam surface and a second cam surface respectively carried by each said camshaft; a first driving connection from each said first cam surface to the related slide of said first set for displacing the related tool carrier means longitudinally of the frame; and a second driving connection from each said second cam surface to the related slide of said second set for displacing the related tool carrier means transversely of the frame.

4. The machine-tool claimed in claim 3, said first driving connection comprising a direct mechanical connection and said second driving connection comprising a fluid-operated actuator, a control for said actuator, means for operating said control valve from said related second cam surface, and means for displacing one of said related second set of slides by said fluid actuator.

5. The machine-tool claimed in claim 1, and means for driving said first drive means from said motor means; and second further means for driving said second further drive means.

6. The machine-tool claimed in claim 2, and common clutch means comprised in said first drive means arranged to be disengageable to disable the drive to both tool carrier means simultaneously, and separate individual clutch means comprised in said first drive means individually disengageable to selectively disable the drive to apply the same to only a selected one of the tool carrier means.

7. A machine-tool according to claim 6, wherein said common clutch means are of the type having two clutching elements engageable in only one relative angular position thereof.

8. The machine-tool claimed in claim 2, said first drive means comprising a first selectively modifiable ratio gear means therefor constituting common ratio-modifying means for modifying the drive ratio to both of said tool carrier means in common and said first drive means further comprising second selectively modifiable ratio gear means therefor constituting an individual ratio-modifying means in said first drive means for selectively modifying the drive ratio to each of said tool carrier means individually at desired times.

9. A machine-tool as claimed in claim 4, wherein the means for displacing the said one of said second set of slides from the fluid-actuator comprises a two-armed rocking lever, a first one arm of the lever being actuated directly by the actuator to rock the lever, and means connected with the other second arm of the lever for displacing the said one of said second set of slides on rocking of the lever.

10. A machine-tool according to claim 9, wherein the means for displacing the said one of said second set of slides includes rack-and-pinion means displaced by said second arm of the rocking lever and acting on the second slide.

11. A machine-tool as claimed in claim 9, wherein the second further drive means comprise a pair of symmetrically disposed rotatable cams, means connecting each said cam with the other second arm of the related rocking lever, and common motor means for rotating the cams.

12. A machine-tool as claimed in claim 9, and an additional second cam rotatably mounted on said other second arm of each rocking lever, follower means engaging said additional second cam and acting to displace the said one of said second set of slides on rocking of the lever and on rotation of said additional second cam, and means for incrementally rotating said additional second cam at each rocking stroke of the lever in a predetermined sense.

13. A machine-tool according to claim 12, wherein the means for incrementally rotating said additional second cam comprises a ratchet rotatable with said additional second cam, and stationary pawl means engageable with the ratchet for imparting one step of rotation thereto as the lever rocks in said predetermined sense.

14. A machine-tool as claimed in claim 12, and a circumferential series of individually retractible stops rotatable with said additional second cam coaxially therewith, and electric switch means actuable by non-retracted ones of said stops and forming part of said selectively operable control means.

15. A machine-tool as claimed in claim 1, including turning tool means carried by said carrier means adjacent the thread cutting tool means.

16. A machine-tool as claimed in claim 1, and chamfering tool means carried by said tool carrier means and mounted adjacent said cutting-off tool means.

17. A machine-tool as claimed in claim 1, and shaving tool means carried by said tool carrier means and mounted adjacent said cutting-off tool means.

References Cited by the Examiner
UNITED STATES PATENTS

| | | | |
|---|---|---|---|
| 1,571,323 | 2/26 | Cole et al. | 82—25 X |
| 1,818,128 | 8/31 | Groene | 82—2 |
| 1,918,626 | 7/33 | Wilt | 82—2.5 X |
| 2,249,148 | 7/41 | Lovely et al. | 82—2.5 |
| 2,417,132 | 3/47 | Schrieber | 82—2.5 |
| 2,579,566 | 12/51 | Godfrioux | 82—21 |
| 2,630,038 | 3/53 | Buell et al. | 82—25 X |

WILLIAM W. DYER, Jr., *Primary Examiner.*

RICHARD H. EANES, Jr., *Examiner.*